US007228611B2

(12) United States Patent
Anderson et al.

(10) Patent No.: US 7,228,611 B2
(45) Date of Patent: Jun. 12, 2007

(54) METHOD OF TRANSFERRING LARGE UNCURED COMPOSITE LAMINATES

(75) Inventors: Donald A. Anderson, Bellevue, WA (US); Brice A. Johnson, Federal Way, WA (US); Stephen S. Spoon, Buckley, WA (US)

(73) Assignee: The Boeing Company, Chicago, IL (US)

( * ) Notice: Subject to any disclaimer, the term of this patent is extended or adjusted under 35 U.S.C. 154(b) by 302 days.

(21) Appl. No.: 10/717,030

(22) Filed: Nov. 18, 2003

(65) Prior Publication Data
US 2005/0102814 A1     May 19, 2005

(51) Int. Cl.
*B23P 11/02* (2006.01)
*B29C 65/00* (2006.01)
*B64C 1/00* (2006.01)

(52) U.S. Cl. .......................... 29/448; 29/464; 29/559; 156/285; 156/286; 156/382; 156/425; 264/102; 264/571; 244/119; 244/120

(58) Field of Classification Search ............... 156/285, 156/286, 382, 350, 358, 425, 433; 29/448, 29/455.1, 464, 559; 264/102, 571; 244/119, 244/120
See application file for complete search history.

(56) References Cited

U.S. PATENT DOCUMENTS

| | | | |
|---|---|---|---|
| 3,085,925 A * | 4/1963 | Schliekelmann | 156/285 |
| 3,713,753 A | 1/1973 | Brunsch | |
| 3,879,245 A | 4/1975 | Fetherson et al. | |
| 4,200,271 A | 4/1980 | August et al. | |
| 4,267,147 A * | 5/1981 | Pogoda et al. | 264/571 |
| 4,311,661 A * | 1/1982 | Palmer | 264/510 |
| 4,475,976 A * | 10/1984 | Mittelstadt et al. | 156/286 |
| 4,541,886 A * | 9/1985 | Marlow et al. | 156/230 |
| 4,562,033 A * | 12/1985 | Johnson et al. | 264/510 |
| 4,657,615 A * | 4/1987 | Braun et al. | 156/245 |

(Continued)

FOREIGN PATENT DOCUMENTS

FR     2597395     10/1987

(Continued)

OTHER PUBLICATIONS

International Search Report, Mar. 17, 2005.

*Primary Examiner*—Essama Omgba
(74) *Attorney, Agent, or Firm*—Ingrassia Fisher & Lorenz, P.C.

(57) ABSTRACT

A method of transferring an uncured composite laminate skin from a lay-up surface of a male mandrel tool to a female cure tool includes defining multiple vacuum zones on the lay-up surface, each zone corresponding to one of a multiple of portions into which the skin is to be separated. For example, to separate the skin into two portions, a low profile seal of a first membrane to the lay-up surface is formed at a first vacuum zone and a second low profile seal for a second membrane is formed at a second vacuum zone. The method further includes laying up a composite laminate skin over all the vacuum zones; separating the composite laminate skin into portions, for example, a first portion over the first vacuum zone and a second portion over the second vacuum zone; and releasing the portions individually into cure tools having an outside mold line surface.

23 Claims, 5 Drawing Sheets

U.S. PATENT DOCUMENTS

| | | | |
|---|---|---|---|
| 4,693,678 A | | 9/1987 | Von Volkli |
| 4,765,942 A | * | 8/1988 | Christensen et al. ........ 264/510 |
| 4,780,262 A | | 10/1988 | Von Volkli |
| 4,824,631 A | * | 4/1989 | Yeager ...................... 264/552 |
| 5,110,395 A | * | 5/1992 | Vaniglia ..................... 156/353 |
| 5,116,216 A | * | 5/1992 | Cochran et al. ............ 425/504 |
| 5,204,033 A | | 4/1993 | Pearce et al. |
| 5,236,646 A | * | 8/1993 | Cochran et al. ............ 264/102 |
| 5,651,850 A | * | 7/1997 | Turner et al. ................ 156/171 |
| 5,683,646 A | | 11/1997 | Reiling, Jr. |
| 5,746,553 A | | 5/1998 | Engwall |
| 5,772,950 A | * | 6/1998 | Brustad et al. .............. 264/510 |
| 5,806,796 A | * | 9/1998 | Healey ................... 244/117 R |
| 5,968,445 A | * | 10/1999 | McCarville et al. ........ 264/571 |
| 6,012,883 A | | 1/2000 | Engwall et al. |
| 6,017,484 A | * | 1/2000 | Hale .......................... 264/510 |
| 6,045,651 A | * | 4/2000 | Kline et al. ................. 156/285 |
| 6,073,670 A | * | 6/2000 | Koury ........................ 156/425 |
| 6,102,241 A | | 8/2000 | Palazzo et al. |
| 6,168,358 B1 | | 1/2001 | Engwall et al. |
| 6,458,309 B1 | * | 10/2002 | Allen et al. ................. 264/319 |
| 6,510,961 B1 | * | 1/2003 | Head et al. ................. 220/645 |
| 6,591,197 B2 | * | 7/2003 | Trudeau et al. ............... 702/33 |
| 6,627,142 B2 | * | 9/2003 | Slaughter et al. ........... 264/510 |
| 6,630,095 B2 | * | 10/2003 | Slaughter et al. ........... 264/510 |
| 6,723,272 B2 | * | 4/2004 | Montague et al. .......... 264/510 |
| 6,743,504 B1 | * | 6/2004 | Allen et al. ................. 428/362 |
| 6,823,918 B2 | * | 11/2004 | Grosskrueger et al. ..... 156/429 |
| 6,958,105 B2 | * | 10/2005 | Herrmann et al. .......... 156/245 |
| 7,048,024 B2 | * | 5/2006 | Clark et al. ................. 156/425 |
| 2005/0039843 A1 | * | 2/2005 | Johnson et al. ............. 156/175 |
| 2005/0039844 A1 | * | 2/2005 | Engwall et al. ............. 156/180 |
| 2006/0108058 A1 | * | 5/2006 | Chapman et al. ........... 156/245 |

FOREIGN PATENT DOCUMENTS

| | | |
|---|---|---|
| GB | 2310822 | 9/1997 |
| WO | WO00/18555 | 4/2000 |

* cited by examiner

METHOD OF TRANSFERRING LARGE UNCURED COMPOSITE LAMINATES

CROSS REFERENCE TO RELATED APPLICATIONS

The present application is related to the following co-pending U.S. patent applications: U.S. patent application Ser. No. 10/646,509, filed Aug. 22, 2003; U.S. patent application Ser. No. 10/646,392, filed Aug. 22, 2003; U.S. patent application Ser. No. 10/630,594, filed Jul. 28, 2003; U.S. patent application Ser. No. 10/646,316, filed Aug. 22, 2003; and U.S. patent application Ser. No. 10/301,949, filed Nov. 22, 2002.

BACKGROUND OF THE INVENTION

The present invention generally relates to manufacturing of large-scale structures using composite materials and, more particularly, to a method of transferring large uncured composite laminates for the manufacture of large aircraft fuselage sections.

The structural performance advantages of composites, such as carbon fiber epoxy and graphite bismaleimide (BMI) materials, are widely known in the aerospace industry. Aircraft designers have been attracted to composites because of their superior stiffness, strength, and lower weight, for example. As more advanced materials and a wider variety of material forms have become available, aerospace usage of composites has increased. For the aerospace industry, composite lamination techniques that would provide faster material lay up rates, for example, would reduce the cost of manufacturing large composite structures. New and innovative composite lamination technologies are envisioned, such as the manufacture of large aircraft fuselage sections that may exceed, for example, 15 to 20 feet in diameter.

Without high speed tape laying techniques that are currently being explored, fabrication of large scale composite structures, such as commercial aircraft fuselage skins, will require the use of numerous pieces of expensive capital equipment—such as automated tape laying and fiber placement machines and large autoclaves—to achieve tape laying rates high enough to make the use of composites economical, allowing composites to replace metal as the primary structural components of the aircraft. Increasing the productivity of each machine is important to producing composite aerospace parts economically.

In the manufacture of aerospace components, current methods of maintaining the aero surface, also referred to as the outer mold line (OML), typically include laying skins into panel sections tooled to the aero surface. Small panels are assembled into larger components. Building smaller panels with equipment tooled to the aero surface requires more equipment and more processing steps than is desired.

Systems and methods for fabricating aerospace composite structures are disclosed in U.S. Pat. No. 4,693,678, issued Sep. 15, 1987, U.S. Pat. No. 4,780,262, issued Oct. 25, 1988, U.S. Pat. No. 6,012,883, issued Jan. 11, 2000, U.S. Pat. No. 6,168,358, issued Jan. 2, 2001, and U.S. Pat. No. 5,746,553, issued May 5, 1998, which are incorporated by reference.

Curing of composite laminate parts after lay up generally entails placing the composite laminate part into an autoclave. Curing is usually performed in a pressure environment inside an autoclave, for example, to eliminate voids within the material that could be caused by air bubbles, and that could cause serious degradation of the strength of the material in the final product. A compaction force on the skin laminate is commonly provided by "bagging" the panel, in which a plastic membrane is placed over the panel and sealed to the tool. Vacuum is then applied, inside the sealed plastic "bag", to the part while pressure is added to the autoclave and outside the bag, causing a differential pressure that compacts the laminate. In that manner, compaction pressures of greater than one atmosphere can be achieved. For composite material placed on the inside of a panel section tool, the aero surface side of the panel remains against the tool, and the non-aero, inside surface of the panel faces the vacuum bag. For a barrel section lay-up on the outside of a mandrel tool, the inside surface of the barrel section remains against the tool and the outside, aero surface of the panel faces the vacuum bag.

If one were to lay up and cure, for example, a fuselage barrel section on a male mandrel, the bag side surface would also be the aerodynamic surface of the barrel section. Since the bag side surface typically is aerodynamically rough and is difficult to make aerodynamically smooth, the result does not meet aero-smoothness requirements. Therefore, if one were to make a large barrel section, one would need to transfer it. That is, to maximize the efficiency of the capital equipment that places and cures the composite material, and to meet aero-smoothness requirements, it would be necessary to build the composite laminate on a male lay-up mandrel, as a complete barrel section, and cut it into sections and transfer them to female cure tools. Laying up the skin as a barrel on a mandrel would allow the equipment to operate at significantly higher rates, thus reducing the need for additional machinery, reducing capital requirements.

SUMMARY OF THE INVENTION

A method of cutting the skins of large aerospace components into sections, separating the uncured laminate from the lay-up tool and transferring the uncured laminate sections to an outer mold line cure tool is needed, especially one that does the transfer without wrinkling the laminate. There is also a need for a method of transferring large uncured composite laminates that reliably and predictably releases the laminate from the mandrel tool. Furthermore, there is a need for a method of transferring large uncured composite laminates from a mandrel tool that does not interfere with the lay-up of the laminate on the mandrel tool. Moreover, there is a need for a composite material fabrication process including a method of transferring large uncured composite laminates that will reduce the number of machines that are required for high speed tape lay up, thus reducing the required factory space and overall capital investment needed. Preferred embodiments of the present invention address one or a combination of these needs with suitable tools and processes to make large composites for aerospace applications.

Transferring skins fabricated on a male lay-up mandrel to a female cure tool can provide both the desired aero-smoothness and a low capital equipment investment. Such a method cuts the skins into sections, separates the uncured laminate from the lay-up tool, and transfers the uncured laminate sections to an outer mold line cure tool. For fuselage skins, it would be far more efficient to lay up an entire barrel section than to build smaller panels and join them during assembly. Placing the composite material directly on the inside of a large cylindrical tool to provide lay up directly to the aero surface, however, presents certain challenges that are not encountered in placing composite material on the outside of a tool, which is a more mature technology.

In the case of barrel sections suitable for making aircraft fuselage panels, for example, an efficient fabrication method is to wrap the composite material all the way around a male mandrel and then to cut the skin in half and transfer the skins to a cure tool. Although it is common practice to place laminates on top of vacuum bag surfaces, or other transfer medium, to take advantage of automated lay-up methods, and to provide an easy means of transfer of the uncured part to the cure tool, these methods apply only to single parts and do not provide an interference free means for automated processes to lay-up multiple parts across adjacent and independent transfer zones. Interrupting the lay-up in the circumferential direction, for example, by providing a built-in seam, or making the lay-up discontinuous in the circumferential direction, in favor of a particular method for transferring skins would decrease fabrication efficiency and increase cost. Moreover, such approaches would interfere with the lay-up of the skin. For example, bumps in the lay-up surface in the vicinity of such an interruption or discontinuity can cause problems with bridging of the material over the bump and interfere with the material delivery head that passes over the bump.

In one aspect of the present invention, a method of sealing a vacuum membrane to a surface includes the steps of: defining a vacuum zone on the surface; placing a breather over the surface within the vacuum zone; placing a membrane over the breather, the membrane covering the vacuum zone; forming a vacuum seal between the membrane and the surface; and covering the vacuum seal with a laminate release surface.

In another aspect of the present invention, a method of forming individual vacuum zones on a lay-up surface of a mandrel tool includes the steps of: defining a first and second vacuum zone on the lay-up surface; placing a first breather over the lay-up surface within the first vacuum zone; placing a second breather over the lay-up surface within the second vacuum zone; placing a first membrane over the first breather, the first membrane covering the first vacuum zone; and placing a second membrane over the second breather, the second membrane covering the second vacuum zone. The method further includes the steps of: forming a first vacuum seal between the first membrane and the lay-up surface; forming a second vacuum seal between the second membrane and the lay-up surface; covering the first vacuum seal with a first laminate release surface; and covering the second vacuum seal with a second laminate release surface.

In still another aspect of the present invention, a method of transferring an uncured composite laminate skin from a lay-up surface of a male mandrel tool to a female cure tool includes the steps of: defining a first vacuum zone on the lay-up surface by applying a first double-stick tape to the lay-up surface; defining a second vacuum zone on the lay-up surface by applying a second double-stick tape to the lay-up surface; placing a first breather over the lay-up surface within the first vacuum zone; placing a second breather over the lay-up surface within the second vacuum zone; placing a first membrane over the first breather, the first membrane covering the first vacuum zone, and adhering the first membrane to the first double-stick tape; and placing a second membrane over the second breather, the second membrane covering the second vacuum zone, and adhering the second membrane to the second double-stick tape.

In a preferred embodiment, the method further includes the steps of: forming a first redundant vacuum seal between the first membrane and the lay-up surface by covering a first edge of the first membrane with a first seal tape, the first seal tape adhering to the first membrane and to the lay-up surface; forming a second redundant vacuum seal between the second membrane and the lay-up surface by covering a second edge of the second membrane with a second seal tape, the second seal tape adhering to the second membrane and to the lay-up surface; covering the first redundant vacuum seal with a first laminate release surface; covering the second redundant vacuum seal with a second laminate release surface; and laying up a composite laminate skin on the lay-up surface over the first vacuum zone and over the second vacuum zone, smoothly covering adjacent redundant vacuum seals of the first vacuum zone and the second vacuum zone. The composite laminate skin smoothly covers the first membrane and the first laminate release surface, the second membrane and the second laminate release surface.

In yet another aspect of the present invention, a method of fabricating a composite laminate aircraft skin in multiple panels that are transferred from a lay-up surface of a mandrel tool to a number of cure tools having an aero surface tooled to an outer mold line, includes the steps of: laying up the composite laminate aircraft skin as a complete barrel section; cutting the composite laminate aircraft skin into multiple panels; transferring at least one of the panels individually and independently of all the other panels from the lay-up surface of the mandrel tool to one of the cure tools having an aero surface; curing the transferred panel, in which the cure tool defines and controls the outer mold line of the transferred panel; and removing the transferred panel from the cure tool.

In a further aspect of the present invention, a method of transferring an uncured composite laminate skin from a lay-up surface of a mandrel tool to a cure tool includes: a step for forming a first low profile seal of a first membrane to a surface of a mandrel tool at a first vacuum zone; a step for forming a second low profile seal of a second membrane to a surface of a mandrel tool at a second vacuum zone; a step for laying up a composite laminate skin over the first vacuum zone and the second vacuum zone; a step for separating the composite laminate skin into a first portion over the first vacuum zone and a second portion over the second vacuum zone; and a step for releasing the first portion individually of the second portion into a first cure tool.

In a still further aspect of the present invention, a tool for manufacturing large aircraft parts includes a male mandrel tool having a lay-up surface and at least one vacuum zone defined on the lay-up surface.

In yet a further aspect of the present invention, a system for manufacturing large aircraft parts includes a multiple head automated tape laying machine; a male mandrel lay-up tool having a lay-up surface with a plurality of vacuum zones defined on the lay-up surface; and a plurality of female cure tools.

In another aspect of the present invention, a method for making composite panels for a fuselage includes the steps of: placing a resin-impregnated tape on a mandrel to form a barrel that is substantially the shape of a fuselage section; cutting the barrel into a plurality of panels on the mandrel; transferring the panels one at a time from the mandrel to at least one cure tool; curing at least one of the panels on the cure tool to form a cured composite panel; and removing the cured composite panel from the cure tool, where the cure tool defines and controls the outer mold line of the panel.

In another aspect of the present invention, a method for making composite panels for a fuselage includes the steps of: inserting a mandrel, which has the composite panels held onto the mandrel, into a cure tool; transferring one composite panel from the mandrel to the cure tool while holding a second composite panel on the mandrel; and removing the mandrel from the cure tool.

A preferred method for making composite panels for a fuselage places (i.e., lays up) a resin-impregnated tape on a mandrel to form a barrel that is substantially the shape of a fuselage section; cuts the barrel into a plurality of panels on the mandrel; transfers the panels one at a time from the mandrel to at least one cure tool; cures the transferred panels on the cure tool to form a cured composite panel; and removes the cured composite panel from the cure tool, wherein each cure tool defines and controls the outer mold line of the panel cured on that tool. In a further preferred embodiment, the method includes the steps of inserting the mandrel into the cure tool; transferring one composite panel from the mandrel to the cure tool while holding a second composite panel on the mandrel; and removing the mandrel from the cure tool.

In another aspect of the present invention, a composite panel for an aircraft is produced by: placing a resin-impregnated tape on a mandrel to form a barrel that is substantially the shape of a fuselage section; cutting the barrel into at least two panels on the mandrel; transferring the panels one at a time from the mandrel to at least one cure tool; curing the panels on the cure tools to form cured composite panels; and removing the cured composite panels from the cure tools. The cure tool defines and controls the outer mold line of the composite panel.

In another aspect of the present invention, an uncured composite laminate adapted for forming into an aircraft fuselage panel is produced by: placing a resin-impregnated tape on a mandrel to form a barrel that is substantially the shape of a fuselage panel; cutting the barrel into at least two panels on the mandrel; and transferring the panels one at a time from the mandrel to at least one cure tool. In a preferred embodiment, the uncured composite laminate is cured on the cure tool to form a cured composite aircraft fuselage panel, wherein the cure tool defines and controls the outer mold line of the cured composite aircraft fuselage panel. The cured composite aircraft fuselage panel is then removed from the cure tool.

In another aspect of the present invention, a system for manufacturing large composite aircraft parts includes a mandrel defining a forming surface in essentially the shape of an entire fuselage section; and at least one tape laying machine associated with the mandrel for laying composite tape onto the forming surface to define the fuselage section.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The Boeing Company is exploring a variety of methods and tools for making large composite structures. The present application describes an invention that is one of a family of inventions for accomplishing this goal The present application is related to the following co-pending U.S. patent applications that are part of this family: U.S. patent application Ser. No. 10/646,509, entitled "Multiple Head Automated Composite Laminating Machine For The Fabrication Of Large Barrel Section Components", filed Aug. 22, 2003; U.S. patent application Ser. No. 10/646,392, entitled "Automated Composite Lay-Up To An Internal Fuselage Mandrel", filed Aug. 22, 2003; U.S. patent application Ser. No. 10/630,594, entitled "Composite Fuselage Machine", filed Jul. 28, 2003; U.S. patent application Ser. No. 10/646,316, entitled "Unidirectional, Multi-Head Fiber Placement", filed Aug. 22, 2003; and U.S. patent application Ser. No. 10/301,949, entitled "Parallel Configuration Composite Material Fabricator", filed Nov. 22, 2002; all of which are assigned to the assignee of the present invention and all of which are hereby incorporated by reference into the present application.

Broadly, an embodiment of the present invention facilitates the fabrication of large parts, such as aircraft fuselage barrel sections, made of composite materials, which may be used, for example, in the manufacture of commercial and military aircraft. In one embodiment, the present invention facilitates fabrication of fuselage sections on large (typically greater than 15 feet in diameter, or maximum thickness), constant cross section, rounded-shaped, for example, circular or elliptical cross-section, mandrels or lay-up tools. In one embodiment, the present invention also may be used in the fabrication from composite materials of large parts, such as fuselage structures, which do not have a constant cross section, such as the forward section or aft section of commercial and military aircraft fuselage structures. One embodiment provides for laying a complete fuselage barrel section of composite material, cutting the barrel section into sub-panels, and transferring each sub-panel sequentially while the remaining sub-panels remain attached to the lay-up mandrel.

Five major problems can be identified in the composite fabrication of such large parts. First, large uncured skins can weigh thousands of pounds, thus prior art, manual transfer methods are not feasible. Second, the large skins can easily wrinkle if mishandled. Third, a tackifier is typically used to get the first plies of composite material to stick to the lay-up, mandrel tool. As a result, the material is very difficult to separate from the lay-up tool when it becomes time to transfer the skin to the cure tool. Fourth, whatever method is used cannot interfere with the lay-up of the skin. Fifth, whatever method is used must allow for the cutting of a barrel lay-up into sub-panels and the transfer of the sub-panels individually to the cure tools without affecting the attachment of the other sub-panels to the lay-up mandrel. In other words, the separation of one panel must not cause the other panels to fall off the tool. Prior art methods typically cannot hold the other sub-panels, once the first one is removed from the lay-up mandrel.

One embodiment of the present invention addresses the above problems and provides other significant advantages. For example, one embodiment of the present invention provides a mechanism for holding and releasing panels, respectively, to and from a mandrel tool. The mechanism incorporates a low profile vacuum seal that does not interfere with the lay up process. One embodiment provides a method of easily separating a large skin lay-up, fabricated as a single unit and sectioned into individual panels, and transferring the individual panels—independently from each other—from a lay-up tool to multiple cure tools without damage to the lay-up skin.

Also for example, in accordance with one embodiment, laying up the fuselage skin as a complete barrel section on a mandrel, cutting the skin into sections, and transferring the sections independently to female cure tools may allow the capital equipment that places the composite material to operate at significantly higher rates—compared, for example, to laying up portions of a barrel section—while meeting aero-smoothness requirements, thus maximizing the efficiency of the capital equipment, reducing the need for additional machinery, and reducing capital requirements. One embodiment may not only reduce the capital equipment requirements by reducing the lay down time, but may also provide a skin that has an aerodynamically smooth surface without compromising manufacturing costs. The capital equipment that places the composite material may include any of various types of automated tape and fiber placement equipment, which are generally commercially available from companies such as Cincinnati Machine. Such automated placement equipment may include, for example, fiber placement heads, and automated tape layers such as flat tape laying machines (FTLM) and contour tape laying machines (CTLM). In more recent developments, composite fiber and tape placement may also include multiple head automated tape laying and fiber placement equipment. For example, multiple head automated tape laying using a male mandrel tool is disclosed in U.S. patent application Ser. No. 10/646, 509, entitled "Multiple Head Automated Composite Laminating Machine For The Fabrication Of Large Barrel Section Components", referenced above and incorporated in the present application.

One embodiment of the present invention may entail the use of a thin membrane, such as a nylon film, stretched over the lay-up surface of a mandrel tool. The thin membrane may be backed by a thin, incompressible breather, which may be sealed on all sides to maintain vacuum integrity. Multiple membranes may be individually sealed to the same tool to define distinct vacuum zones. Vacuum may be applied to each vacuum zone, drawing each of the thin membranes, or films, tight and wrinkle free to the lay-up surface. Once the skin, which may be, for example, a composite laminate material, including resin-impregnated tape, is placed onto the membranes, and cut into panels, the skin panels may remain affixed to the tool until the vacuum is released from under each of the membranes, allowing the skin panels to separate from the tool. The vacuum under each of the multiple membranes, or distinct vacuum zones, may be individually released to allow for removal of each individual skin panel, or portion, of the laminate while the rest remain securely held on the tool.

For example, a full barrel section may be built onto the tool, cut in half, and separated one half at a time to transfer to half-cylinder cure tools. For very large barrel sections, it may be desirable to cut the barrel into a greater number of smaller panels, such as quarter-section panels or even third-section panels and correspondingly use, for example, quarter-cylinder or third-cylinder cure tools. An embodiment of the invention includes a low profile, redundant vacuum seal for adjacent membranes or vacuum zones, with common edges, over which composite laminate may be placed. A redundant seal is needed to ensure integrity of the vacuum seal during the part transferring steps to ensure that the parts remaining on the tool remain affixed to the tool until they are transferred. Conventional, prior art vacuum bag sealing methods, which may resemble a bead of caulking compound, cannot be used because they cause a bump in the surface that interferes with the laminate lay down equipment delivery head and causes bridging or wrinkling in the laminate. In contrast to the high profile vacuum sealing methods of the prior art, an embodiment of the invention utilizes a low profile redundant seal that does not interfere with the lay up equipment or adversely affect quality of the laminate. The low profile of the vacuum seals allows a normal placement of the laminate skin material over the vacuum seals, which cannot be achieved satisfactorily using prior art techniques.

In one embodiment, once the skin is completed, the individual panels, i.e., portions of the skin over each individual vacuum zone, may be cut apart on the tool. The cutting separates the skin into pieces, i.e. the individual portions, but does not break the vacuum integrity of the individual vacuum zones under each portion. To prepare for the skin transfer, a cure tool is located just below the lay-up mandrel, with only inches separating the laminate skin from the cure tool. The vacuum is then released from only the appropriate zone. The weight of the skin causes the thin membrane to pull free from the mandrel tool and drop the released portion of the skin into the cure tool. By maintaining vacuum in the other zone(s), the other portions remain affixed to the lay-up mandrel. The use of redundant vacuum seals, as described above, helps ensure that only the intended skin portion is released to ensure control of the process, for example, and to enhance operator safety. The process can then be repeated until all portions are transferred to cure tools.

Figure 1:
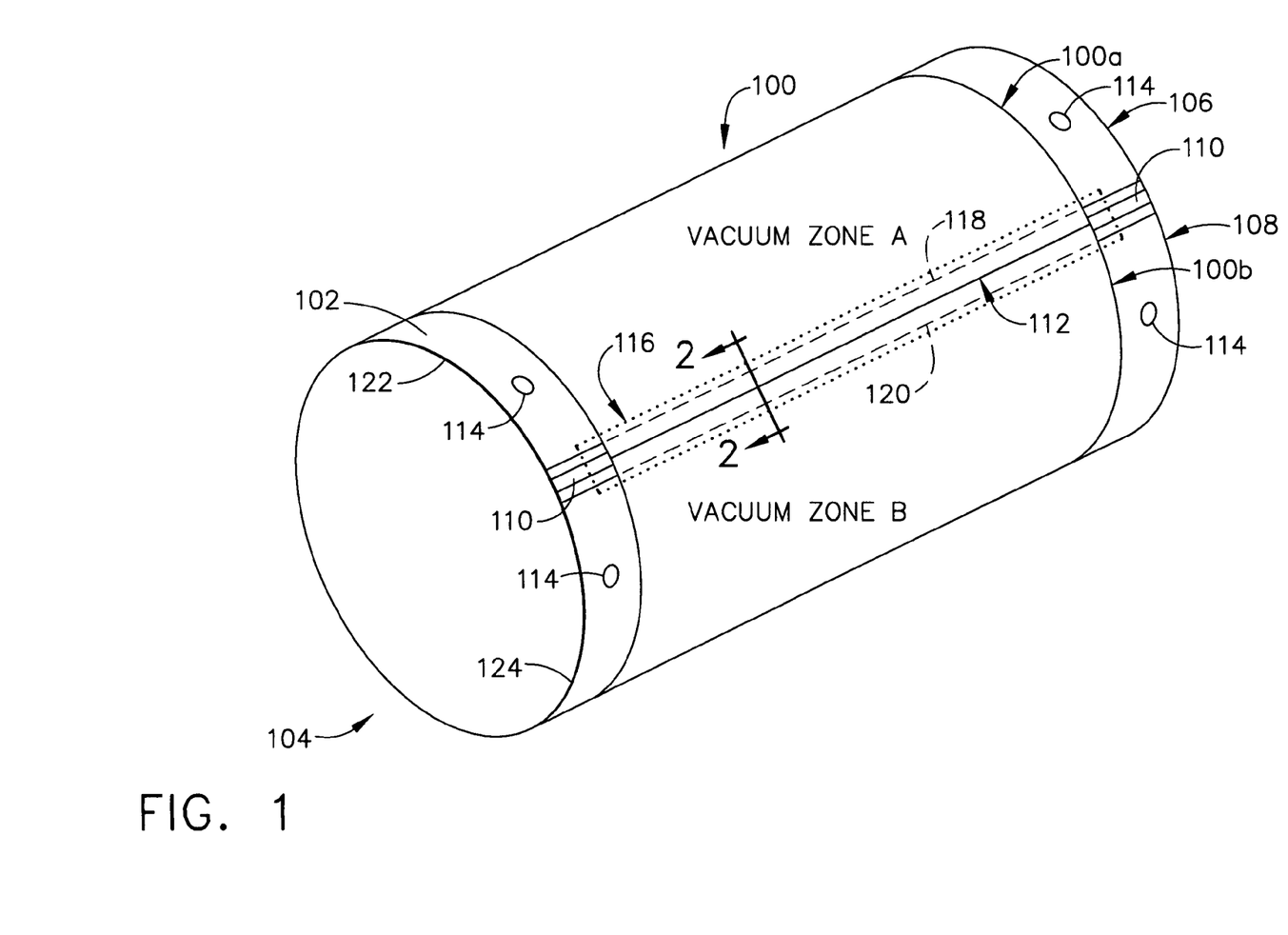
FIG. 1 is a diagram showing a perspective view of an exemplary mandrel tool covered by a membrane with multiple vacuum zones and vacuum seals formed according to one embodiment of the present invention.

Referring now to the figures, FIG. 1 illustrates an exemplary overall layout of a composite laminate skin 100, on a lay-up surface 102 of a mandrel tool 104, in accordance with one embodiment. Lay-up surface 102 may also be referred to as a forming surface since it may define the shape of the part to be formed on the mandrel 104. So, for example, the forming surface may be defined in essentially the shape of an entire large fuselage section to be formed on mandrel 104. Lay-up of composite laminate skin 100 may be performed in a single complete barrel section and later divided into separate portions 100a and 100b, which may also be described as panels or sections of composite laminate skin 100. Two vacuum zones 106 and 108 may be defined as shown in FIG. 1. The number of vacuum zones may correspond to the number of portions—such as portions 100a and 100b—into which it is desired to separate composite laminate skin 100 for curing, which may be, for example, three or more, although two vacuum zones are used in the example illustrated by FIG. 1.

A first vacuum zone 106, also labeled "Vacuum Zone A" in FIG. 1, may cover approximately half of lay-up surface 102 of a mandrel tool 104. A second vacuum zone 108, labeled "Vacuum Zone B" in FIG. 1, may also cover approximately half, or the remainder of lay-up surface 102 of mandrel tool 104. A rebate 110 may be provided, for example, as an inlay of plastic or other appropriate material, which may be flush with the lay-up surface 102 of mandrel tool 104. Rebate 110 may separate or lie between vacuum zone 106 and vacuum zone 108. A second rebate (not shown in FIG. 1) may be provided on the opposite side of mandrel lay-up surface 102, and may also separate vacuum zone 106 from vacuum zone 108. Rebates 110 may be disposable and may aid in cutting composite laminate skin 100 into separate portions 100a and 100b along panel separation line 112 without damaging lay-up surface 102 of mandrel tool 104. Mandrel tool 104 may also include vacuum ports 114 for providing a vacuum or pressure reduction to vacuum zones 106 and 108. Because vacuum zones 106 and 108 may be individually sealed as separate distinct vacuum zones, a first and second vacuum may be individually and independently applied to and released from each vacuum zone 106 and 108, for example, through vacuum ports 114 or through conventional vacuum fittings applied to the bags or membranes covering vacuum zones 106 and 108.

A low profile vacuum seal region 116 is identified by a dotted line in FIG. 1. Low profile vacuum seal region 116 may be generally located, as shown in FIG. 1, in the vicinity of panel separation line 112 between vacuum zone 106 and vacuum zone 108. Low profile vacuum seal region 116 may include one or more low profile vacuum seals, as described above. For example, as shown in FIG. 1, low profile vacuum seals at a boundary 118 of vacuum zone 106 and at a boundary 120 of vacuum zone 108 may be smoothly covered by a composite laminate skin 100, i.e., without bridging or wrinkling, for example, in the laminate. The boundaries of adjacent vacuum zones—such as boundaries 118 and 120 of adjacent vacuum zones 106 and 108, respectively—may be separated by a short distance from panel separation line 112, allowing for composite laminate skin 100 to be safely cut along panel separation line 112 without violating the integrity of adjacent vacuum zones 106 and 108, as more clearly shown in FIG. 2.

Low profile vacuum seal region 116 may include multiple, distinct and adjacent vacuum zones—such as vacuum zones 106 and 108—with low profile, redundant vacuum seals—which, even though separated by a short distance, as described above, are referred to herein as being adjacent if their respective vacuum zones are adjacent. Thus, low profile vacuum seal region 116 may provide for multiple vacuum zones with low profile, adjacent seals over which automated material placement processes can place material—such as composite laminate skin 100—onto lay-up surface 102 of mandrel tool 104 so that the completed lay-up—such as composite laminate skin 100—may be subsequently cut into sub-panels—such as portions 100a and 100b—and transferred sequentially, i.e., one at a time, without affecting the attachment of the other sub-panels to the lay-up-mandrel tool 104.

A conventional vacuum seal may be formed at other boundaries—such as boundary 122 of vacuum zone 106 and boundary 124 of vacuum zone 108—that are not to be covered by a composite laminate skin, as shown in FIG. 1.

Figure 2:
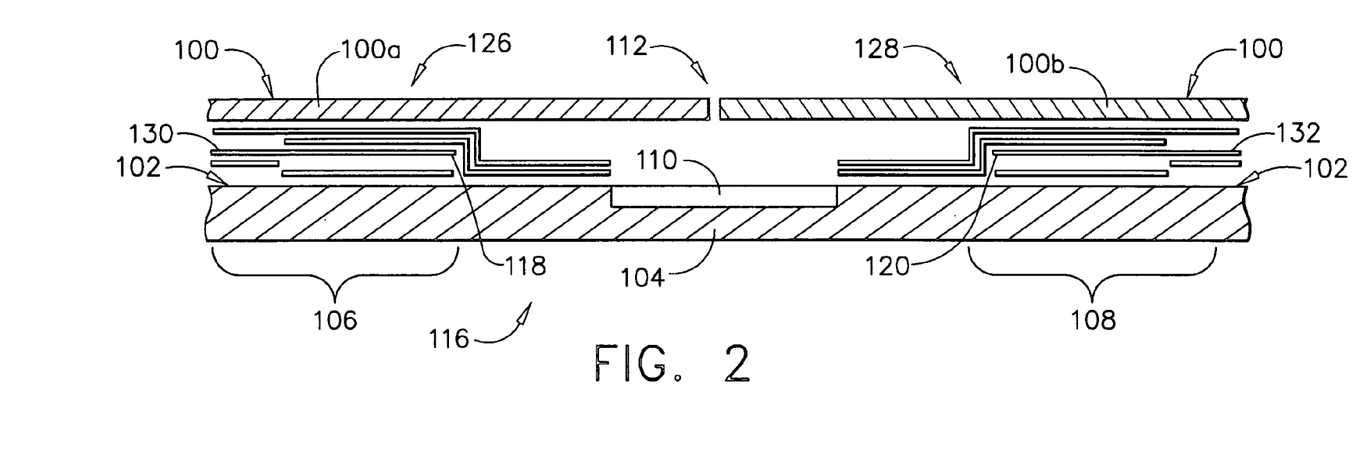
FIG. 2 is a cross sectional diagram, viewed along line 2—2 of FIG. 1, of a portion of an exemplary mandrel tool covered by a membrane with multiple vacuum zones and vacuum seals formed according to one embodiment of the present invention.

FIG. 2 shows section 2—2 of FIG. 1 in the low profile vacuum seal region 116, and diagrammatically illustrates an overall cross sectional view of two independent vacuum seals 126 and 128, respectively, for distinct, individual vacuum zones 106 and 108, that seal membranes 130 and 132, respectively, to lay-up surface 102 of mandrel tool 104. As shown in FIG. 2, rebate 110 may be provided in the lay-up surface 102 between vacuum seal 126 and vacuum seal 128 so that rebate 110 is between vacuum zone 106 and vacuum zone 108, with vacuum zone 106 defined on one side of rebate 110 and vacuum zone 108 defined on a second side of rebate 110. Also, as shown in FIG. 2, panel separation cut 112 may be made in composite laminate skin 100 between vacuum zone 106 and vacuum zone 108 to produce one portion 100a of composite laminate skin 100 over vacuum zone 106 and a separate portion 100b of composite laminate skin 100 over vacuum zone 108. Composite laminate skin 100 may be cut over rebate 110, for example, using an autopsy saw, in order to minimize the risk of any damage occurring to lay-up surface 102 and confine any damage to rebate 110, which may be a replaceable rebate insert.

Figure 3:
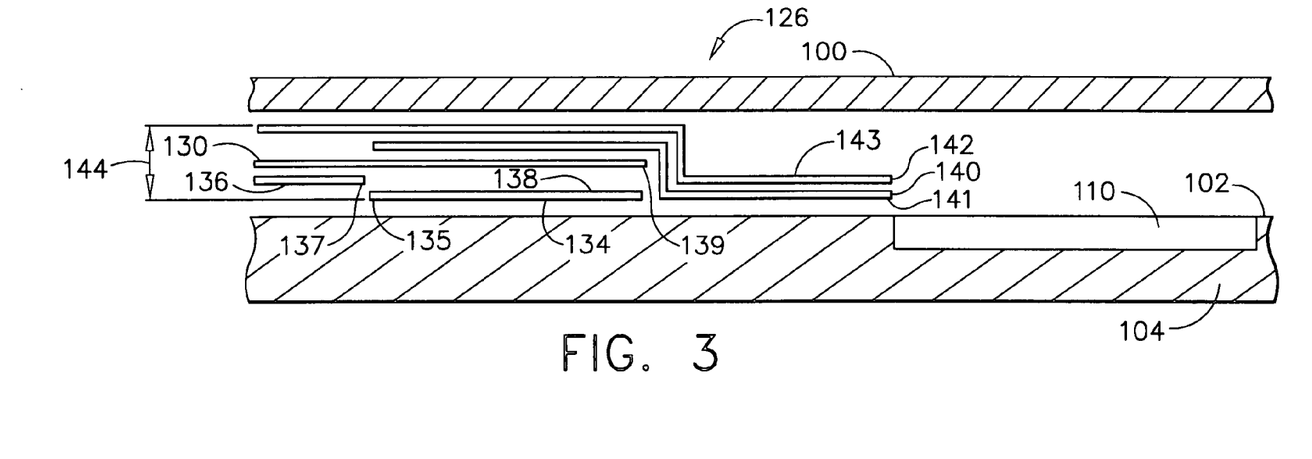
FIG. 3 is a cross sectional diagram, showing in more detail than FIG. 2, a portion of an exemplary mandrel tool having a membrane with multiple vacuum zones and vacuum seals as shown in FIG. 2.

FIG. 3 shows a more detailed diagrammatic view of the configuration, for example, of vacuum seal 126. Vacuum seal 126 may be a redundant vacuum seal in the sense that more than one layer of tape or adhesive, any one layer of which may be adequate to form a vacuum seal between vacuum membrane 130 and lay-up surface 102, may be used. The redundant vacuum seal 126 may include a ply of double-stick tape 134. For example, double-stick tape 134 may be a two-inch wide, double-sided adhesive tape suitable for adhering to lay-up surface 102 and membrane 130. Double-stick tape 134 may be approximately 0.010 inches thick, for example. Membrane 130, for example, may be a thin nylon film that may be suitable for vacuum bagging composite materials. Membrane 130 may have a thickness of approximately 5 mils, or 0.005 inch, for example. Suitable membrane material may be sold, for example, by Airtec, Inc. or by Richmond, Inc. A membrane 130 having a thickness of approximately 10 mils may be more suitable in order to avoid wrinkles in the film of membrane 130. A vacuum zone—such as vacuum zone 106—may be defined by placing double-stick tape 134 on, and adhering it to, lay-up surface 102 at a boundary of the vacuum zone—such as boundary 118 of vacuum zone 106.

A breather 136, which may be, for example, a breathable, veil film which is relatively incompressible under vacuum pressure, may be placed over lay-up surface 102 within a vacuum zone—such as vacuum zone 106—inside the boundary 118 of vacuum zone 106 formed by double-stick tape 134. Breather 136 may be approximately 0.003 inches thick, for example. Although breather 136 is shown, for clarity, in FIGS. 2 and 3 at a different level relative to surface 102 than double-stick tape 134, breather 136 may be placed over lay-up surface 102 and in contact with surface 102, just as double-stick tape 134 is actually in contact with surface 102. An edge 137 of breather 136 need not be perfectly aligned with or in contact with an edge 135 of double-stick tape 134. In fact, there may be gaps of an inch or more between edge 137 and edge 135. Breather 136 may be held in place during placement of breather 136 on surface 102, for example, by small sections of breathable adhesive tape (not shown) which may be similar to cloth medical tape, and which may be placed by hand at convenient intervals to adhere breather 136 on surface 102. Other methods may also be used such as, for example, use of small pieces of double-stick tape or a self-adhesive backing on breather 136. The purpose of breather 136 is to ensure that all parts of vacuum zone 106 may be evenly evacuated when a vacuum is applied to an interior space, containing breather 136, between lay-up surface 102 and membrane 130 formed by, for example, vacuum seals at the boundaries—such as boundaries 118 and 122—of vacuum zone 106, including vacuum seal 126, so that, for example, no pockets of trapped air may be formed by direct contact of non-breathable membrane 130 with non-breathable surface 102 at the edges of a bulge or wrinkle, for example, in membrane 130.

Membrane 130 may be placed over breather 136 and may cover, for example, vacuum zone 106. Membrane 130 may be placed over the exposed side of double-stick tape 134, sticking membrane 130 to the exposed side of double-stick tape 134 so that double-stick tape 134 is under the edge of the membrane 130, which should be wrinkle free to avoid any vacuum leaks. Adhering membrane 130 to the exposed side of double-stick tape 134 may form a vacuum seal between membrane 130 and lay-up surface 102. The vacuum seal so formed may be the first seal 138 of a multiple stage redundant vacuum seal, such as redundant vacuum seal 126. The membrane 130 may be trimmed back to the edge 139 of the first seal 138.

A second, redundant seal may be formed by applying a seal tape 140—which may be, for example, a Mylar® type tape approximately two inches wide—over the edge 139 of the membrane 130 and onto the lay-up surface 102 of the mandrel tool 104 so that seal tape 140 covers the edge 139 of membrane 130 and adheres to both membrane 130 and lay-up surface 102 of mandrel tool 104. Thus, vacuum seal 126, for example, may include at least two seals forming a redundant vacuum seal 126, one seal formed by double-stick tape 134 and a second, redundant one formed by seal tape 140. Adjacent seals—such as vacuum seal 126 and vacuum seal 128—should be separated enough to allow sufficient room to cut through the laminate 100 without destroying vacuum integrity of either membrane—such as membrane 130 and membrane 132. An additional tape, referred to by its function as a laminate release surface 142, may be located over the edge 141 of the seal tape 140 and redundant vacuum seal 126, and may cover seal tape 140 and vacuum seal 126 to provide for a release of laminate 100 from lay-up surface 102 of mandrel tool 104 when needed. Laminate release surface 142, for example, may be a six-inch to eight-inch wide, teflon tape having a smooth, non-stick, upper surface 143. Although Teflon is a trademark, teflon is used here as the familiar generic name referring to the chemical composition, or family of compositions, polytetrafluoroethylene (PTFE).

The completed vacuum seal 126 may result in a very low profile 144, which may be, for example, less than 1 millimeter or 0.04 inches. This low profile 144 may allow automated composite laminating equipment to smoothly pass over the vacuum seal 126 without interference and without wrinkling or bridging the composite laminate material. Thus, automated composite laminating equipment may be used, for example, to lay up composite laminate skin 100 smoothly, i.e., without aberrations such as wrinkling and bridging, as shown in FIGS. 2 and 3, on lay-up surface 102 over vacuum zone 106 and vacuum zone 108. Composite laminate skin 100 may be placed over and smoothly cover membrane 130, laminate release surfaces 142 of redundant vacuum seals 126 and 128, and membrane 132. Vacuum may be applied to vacuum zones 106 and 108 before lay up of composite laminate skin 100, for example, to test the seals and vacuum integrity of vacuum zones 106 and 108 or to ensure that membranes 130 and 132 are drawn tightly down and held on lay-up surface 102. Vacuum may be applied underneath a membrane—such as membrane 130—and over the lay-up surface 102 to an interior space, as described above, of each vacuum zone—such as vacuum zone 106—to hold, for example, membrane 130 to lay-up surface 102 at vacuum zone 106. Vacuum may be applied to each distinct vacuum zone individually and independently of the others, also as described above. Vacuum may be applied concurrently to all vacuum zones and may be released from each vacuum zone one at a time.

Figure 4:
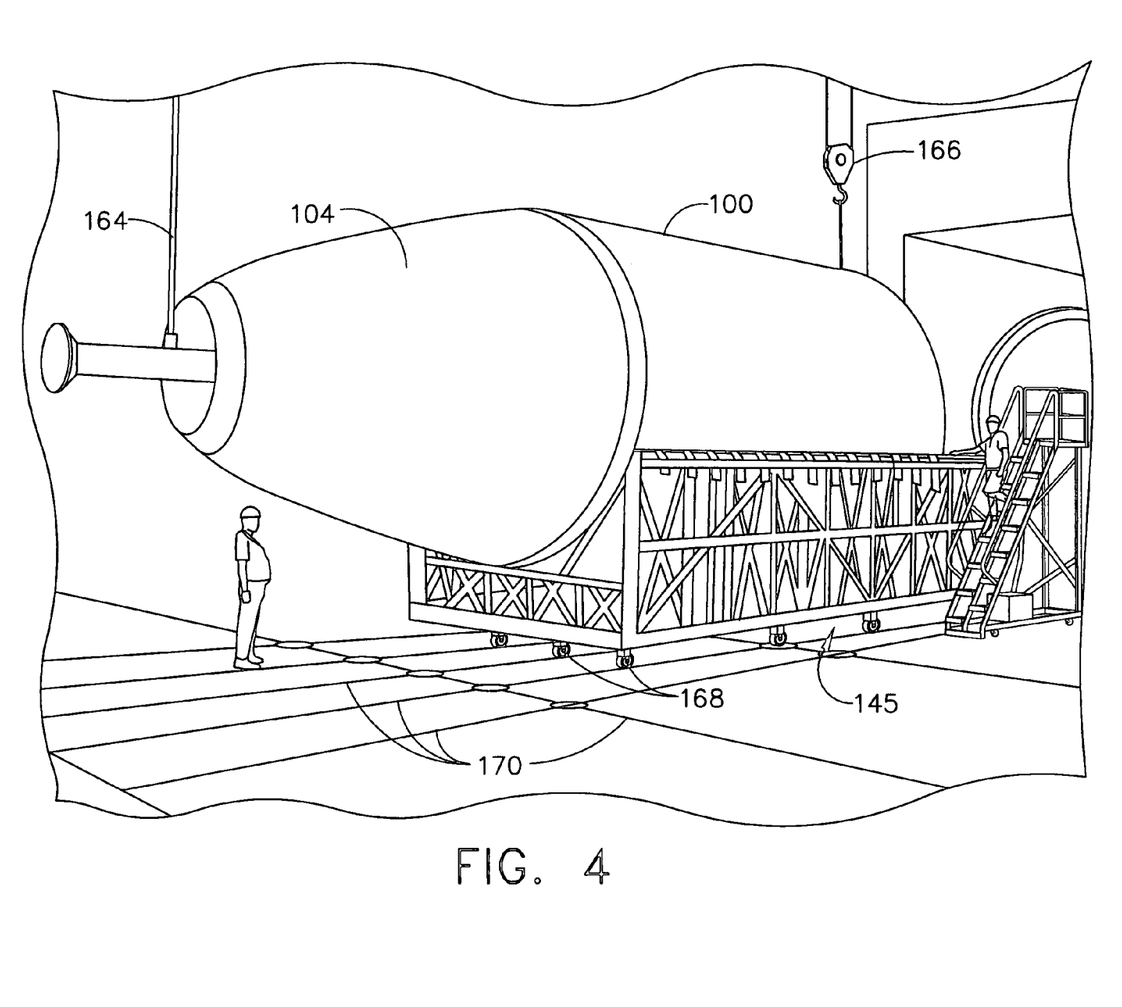
FIG. 4 is a perspective view showing an uncured composite laminate on a mandrel tool, positioned and suspended above a cure tool, in accordance with an embodiment of the present invention.

Once composite laminate skin 100 is complete, composite laminate skin 100 may be cut into panels or sections—such as portions 100a and 100b—in preparation for transfer to cure tools—such as cure tool 145 shown in FIG. 4 and cure tools 146 and 147 shown in end view in FIGS. 5A through 5D. U.S. patent application Ser. No. 10/646,509, referenced above and incorporated herein, discloses, for example, that the male mandrel lay-up tool—such as mandrel tool 104—may be removable from the multiple head automated composite tape laying equipment so that the mandrel tool 104 may be moved from one stage of a manufacturing process to another. Thus, for example, mandrel tool 104 may be removed from multiple head tape laying equipment used to lay up composite laminate skin 100 and may be moved about and positioned while suspended, for example, from an overhead gantry by cables—such as cable 164 or block and tackle 166 as shown in FIG. 4. A cure tool—such as cure tool 145 shown in FIG. 4—may also be moveable so that, for example, mandrel tool 104 with composite laminate skin 100 may be positioned above cure tool 145, as shown in FIG. 4, via either moving mandrel tool 104 with composite laminate skin 100, moving cure tool 145, or some combination of moving both. For example, cure tool 145 may be fitted with rollers or wheels 168, which may be disposed to run on tracks 170.

Thus, mandrel tool 104 with composite laminate skin 100 cut into panel sections—such as portions 100a and 100b—may be moved into position in the vicinity of cure tools—such as cure tools 146 and 147 shown in end view in FIGS. 5A through 5D. Each cure tool 146 and 147 may have an interior surface 148, which may be tooled to an outer mold line (OML) of a part—such as portions 100a and 100b of composite laminate skin 100, so that interior surface 148 may control and define the outer mold line to provide an aero surface, or aerodynamically smooth surface, of each cure tool 146 and 147. Thus, the cure tools 146 and 147 may define and control the outer mold line of portions 100a and 100b of composite laminate skin 100, which may be formed in compliance with aero-smoothness requirements, as described above. For example, in FIGS. 5A and 5B, interior surface 148 may be tooled to an outer mold line (OML) of portion 100b, and in FIGS. 5C and 5D, interior surface 148 may be tooled to an OML of portion 100a.

Prior to transferring the panels, it may be ensured that a vacuum is applied to all bags, i.e., to all vacuum zones, such as vacuum zones 106 and 108. Alternatively, it may be ensured that a vacuum is applied to all vacuum zones—such as vacuum zones 106 and 108—prior to cutting composite laminate skin 100 into portions 100a and 100b. Vacuum may be applied to each vacuum zone, for example, vacuum zone 106, in order to hold the membrane 130 and portion 100a to the lay-up surface 102 at vacuum zone 106 on mandrel tool 104. In the example used to illustrate one embodiment, vacuum may also be applied to vacuum zone 108, in order to hold the membrane 132 and portion 100b to the lay-up surface 102 at vacuum zone 108.

Composite laminate skin 100 may be cut by cutting through the uncured composite laminate at the designated areas, such as panel separation cut 112, being careful not to cut into the individual vacuum bags or membranes—such as membrane 130 or membrane 132. Composite laminate skin 100 may be cut, for example, using a saw like an autopsy saw to cut the uncured laminate in the vicinity of a rebate 110. It should be ensured that all the fibers of the uncured laminate material of composite laminate skin 100 have been severed. After cutting, portions 100a and 100b of composite laminate skin 100 may be separated from laminate release surfaces 142. For example, a wedge may be used to pop the laminate off the teflon tape of laminate release surface 142, taking care not to wrinkle the laminate. The composite laminate skin 100 may be peeled back far enough so that the membrane—such as membrane 130 or 132—can be slit when needed to release the vacuum of the desired vacuum zone.

Figure 5A:
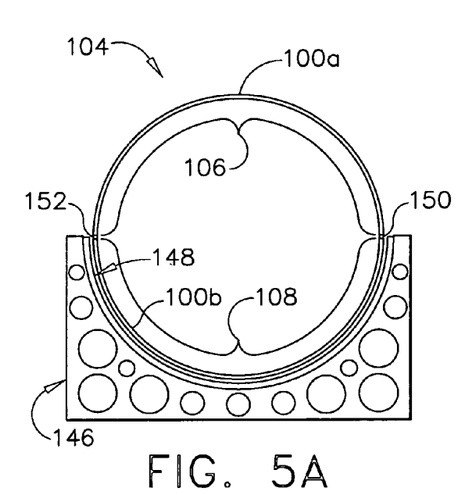
FIGS. 5A, 5B, 5C, and 5D are diagrams showing steps for releasing an uncured composite laminate from a mandrel tool and transferring it to a curing tool, in accordance with an embodiment of the present invention.

Mandrel tool 104, with portions 100a and 100b of composite laminate skin 100 held to lay-up surface 102 by vacuum applied to vacuum zones 106 and 108, may be lifted over a cure tool 146 and positioned a few inches above the OML interior surface 148, as shown in FIG. 5A. Mandrel tool 104 may be said to be inserted into cure tool 146, due the concave shape of cure tool 146, as seen in FIG. 5A. Mandrel tool 104 may be oriented so that vacuum zone 108 and portion 100b are disposed above and aligned with cure tool 146. Vacuum may be released from vacuum zone 108 (without releasing vacuum from vacuum zone 106) by cutting through the membrane 132 along the circumferential edges of the membrane 132—such as boundary 124 of vacuum zone 108. The membrane 132 may also be cut along the longitudinal sides—such as boundary 120 of vacuum zone 108. For example, a knife blade attached to a long flat stick may be used in difficult to reach areas. Because the laminate was previously released from the vacuum seal edge 120 and laminate release surface 142, if one side, for example, side 150 of portion 100b releases before the other side 152, the entire laminate skin portion 100b may drop, hinged by the membrane 132, so that portion 100b hangs from mandrel tool 104, supported by membrane 132 on side 152. All that may then be needed to release portion 100b may be to cut that supporting section of the membrane 132 along side 152 and lift the mandrel tool 104 out of the way.

Figure 5B:
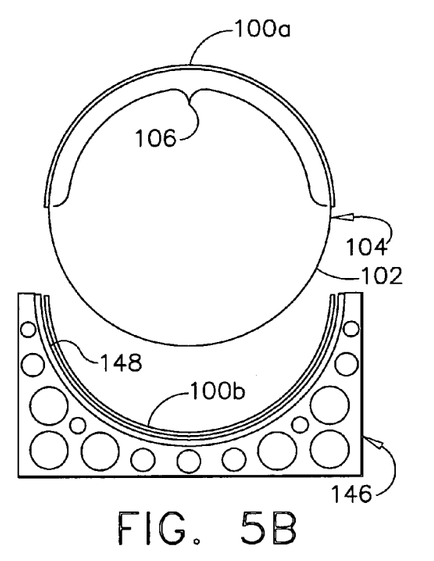

Once vacuum has been released from vacuum zone 108, portion 100b of composite laminate skin 100 may be allowed to drop into cure tool 146, while portion 100a remains securely held by vacuum zone 106 onto mandrel tool 104. Mandrel tool 104 may be lifted away from cure tool 146 as shown in FIG. 5B. Portion 100b and cure tool 146 may subsequently be bagged and placed in an autoclave for curing of portion 100b. After curing, portion 100b may be removed from cure tool 146 for joining to portion 100a.

Figure 5C:
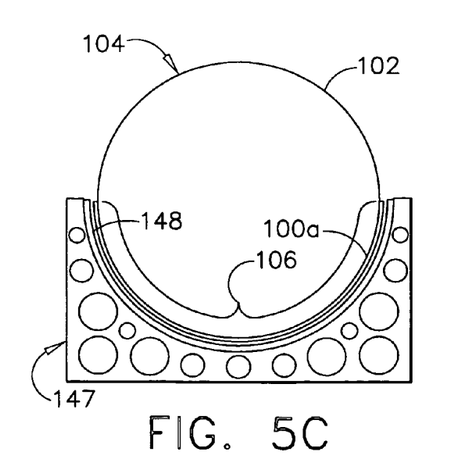

Mandrel tool 104, with portion 100a of composite laminate skin 100 held to lay-up surface 102 by vacuum applied to vacuum zone 106, may be lifted over a cure tool 147 and oriented so that vacuum zone 106 and portion 100a are disposed above cure tool 147 and positioned a few inches above the OML interior surface 148 of cure tool 147, as shown in FIG. 5C. Vacuum may be released from vacuum zone 106 by cutting through the membrane 130 along the circumferential edges of the membrane 130—such as boundary 122 of vacuum zone 106. The membrane 132 may also be cut along the longitudinal sides—such as boundary 118 of vacuum zone 106.

Figure 5D:
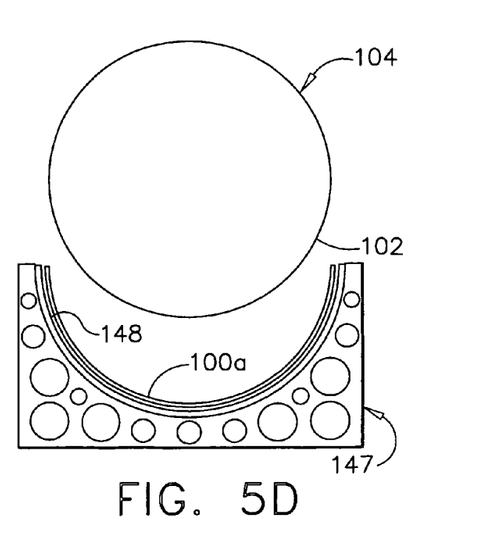

Once vacuum has been released from vacuum zone 106, portion 100a of composite laminate skin 100 may be allowed to drop into cure tool 147, and mandrel tool 104 may be lifted away from cure tool 147 as shown in FIG. 5D.

Portion 100a and cure tool 147 may subsequently be bagged and placed in an autoclave for curing of portion 100a. After curing, portion 100a may be removed from cure tool 147 and joined to portion 100b to form a complete barrel section composite laminate fuselage skin having the form of composite laminate skin 100.

Figure 6A:
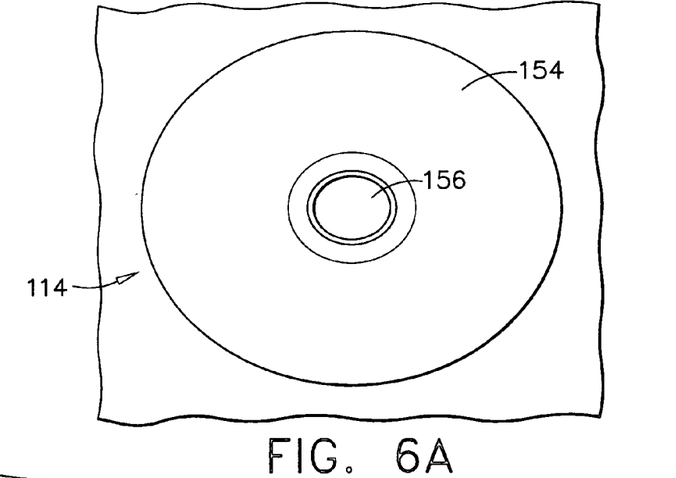
FIGS. 6A and 6B are perspective views from above and below, respectively, of a vacuum port in a mandrel tool in accordance with an embodiment of the present invention.
Figure 6B:
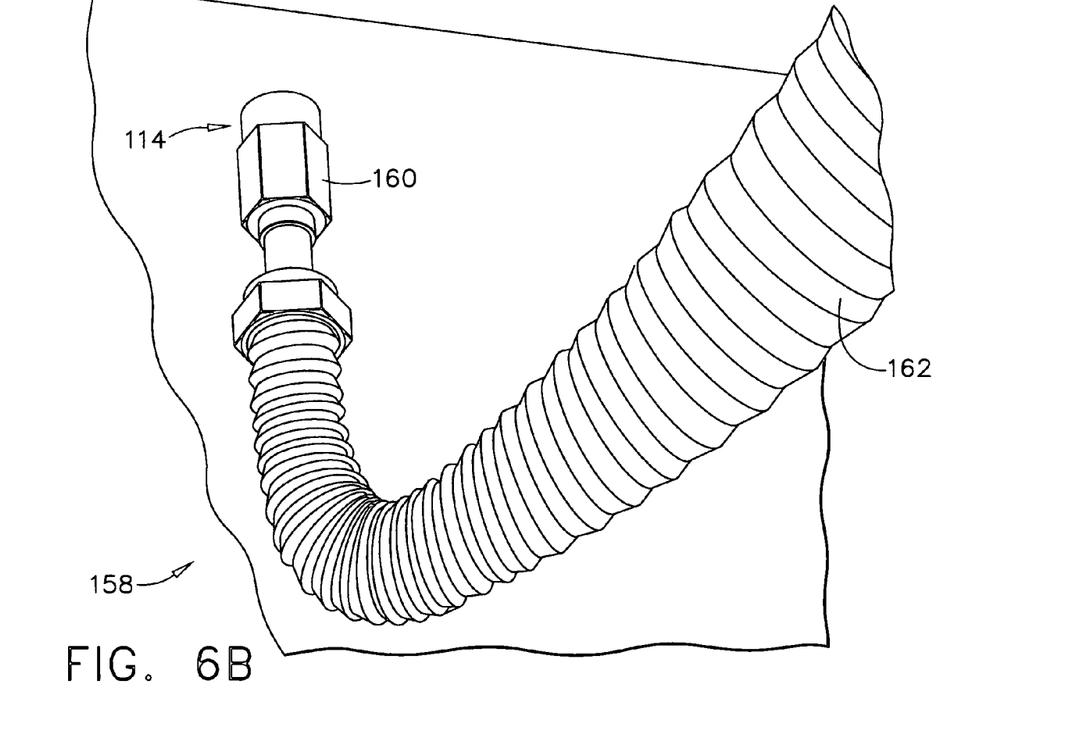

FIGS. 6A and 6B show vacuum port 114 of mandrel tool 104 in more detail. FIG. 6A shows vacuum port 114 from the lay-up surface 102 side of mandrel tool 104. Vacuum port 114 may include a recess area 154, which may be recessed below the level of lay-up surface 102. Vacuum port 114 may include an opening 156 through lay-up surface 102 to the interior 158 of mandrel tool 104, shown in FIG. 6B. FIG. 6B shows vacuum port 114 from the interior 158 of mandrel tool 104. Vacuum port 114 may include a hose attachment fitting 160 connected to opening 156. A hose 162 may be attached to hose attachment fitting 160 and may be connected to a vacuum source (not shown) so that a vacuum may be applied to the lay-up surface 102 through opening 156.

It should be understood, of course, that the foregoing relates to preferred embodiments of the invention and that modifications may be made without departing from the spirit and scope of the invention as set forth in the following claims.

We claim:

1. A method of sealing a vacuum membrane to a surface, comprising the steps of:
    defining a vacuum zone on the surface including placing a double-stick tape on the surface at a boundary of said vacuum zone;
    placing a breather over the surface within said vacuum zone;
    placing a membrane over said breather, said membrane covering said vacuum zone;
    forming a vacuum seal between said membrane and the surface by sticking said membrane to an exposed side of said double stick tape adhered to the surface at said boundary of said vacuum zone; and
    covering said vacuum seal with a laminate release surface.

2. The method of claim 1, wherein said step of placing said breather comprises adhering said breather to the surface inside said vacuum zone.

3. The method of claim 1, wherein said step of covering said vacuum seal comprises covering said vacuum seal with a teflon tape.

4. The method of claim 1, further comprising a step of:
    applying a vacuum to an interior space between the surface and said membrane.

5. The method of claim 1, further comprising a step of:
    holding said membrane on the surface over said vacuum zone by applying a vacuum underneath said membrane and over said surface.

6. The method of claim 5, wherein said holding step includes applying said vacuum through a vacuum port in said mandrel tool.

7. A method of forming individual vacuum zones on a lay-up surface of a mandrel tool, comprising the steps of:
    defining a first vacuum zone on the lay-up surface;
    defining a second vacuum zone on the lay-up surface;
    placing a first breather over the lay-up surface within said first vacuum zone;
    placing a second breather over the lay-up surface within said second vacuum zone;
    placing a first membrane over said first breather, said first membrane covering said first vacuum zone;

placing a second membrane over said second breather, said second membrane covering said second vacuum zone;

forming a first vacuum seal between said first membrane and the lay-up surface;

forming a second vacuum seal between said second membrane and the lay-up surface;

covering said first vacuum seal with a first laminate release surface; and covering said second vacuum seal with a second laminate release surface.

8. The method of claim 7, further comprising a step of:

holding said first membrane to the lay-up surface at said first vacuum zone by applying a first vacuum to a first interior space between the lay-up surface and said first membrane, said first breather being within said first interior space.

9. The method of claim 7, further comprising a step of:

holding said second membrane to the lay-up surface at said second vacuum zone by applying a second vacuum to a second interior space between the lay-up surface and said second membrane, said second breather being within said second interior space.

10. The method of claim 7, further comprising a step of:

providing a rebate in the lay-up surface between said first vacuum seal and said second vacuum seal.

11. The method of claim 7, further comprising steps of:

laying up a composite laminate skin on said lay-up surface over said first membrane, said first laminate release surface, said second membrane, and said second laminate release surface; and cutting said composite laminate skin between said first vacuum seal and said second vacuum seal.

12. The method of claim 7, wherein said step of defining said first vacuum zone comprises:

placing a double-stick tape on the lay-up surface at a first boundary of said first vacuum zone to be smoothly covered by a composite laminate skin; and forming a conventional vacuum seal at a second boundary of said first vacuum zone not to be covered by said composite laminate skin.

13. A method of transferring an uncured composite laminate skin from a lay-up surface of a male mandrel tool to a female cure tool, comprising the steps of:

defining a first vacuum zone on the lay-up surface by applying a first double-stick tape to the lay-up surface;

defining a second vacuum zone on the lay-up surface by applying a second double-stick tape to the lay-up surface, wherein said first vacuum zone and said second vacuum zone are adjacent;

placing a first breather over the lay-up surface within said first vacuum zone;

placing a second breather over the lay-up surface within said second vacuum zone;

placing a first membrane over said first breather, said first membrane covering said first vacuum zone, and adhering said first membrane to said first double-stick tape;

placing a second membrane over said second breather, said second membrane covering said second vacuum zone, and adhering said second membrane to said second double-stick tape;

forming a first redundant vacuum seal between said first membrane and the lay-up surface by covering a first edge of said first membrane with a first seal tape, said first seal tape adhering to said first membrane and to the lay-up surface;

forming a second redundant vacuum seal between said second membrane and the lay-up surface by covering a second edge of said second membrane with a second seal tape, said second seal tape adhering to said second membrane and to the lay-up surface, wherein said second redundant vacuum seal is adjacent to said first redundant vacuum seal;

covering said first redundant vacuum seal with a first laminate release surface;

covering said second redundant vacuum seal with a second laminate release surface;

laying up a composite laminate skin on said lay-up surface over said first vacuum zone and over said second vacuum zone, wherein:

said composite laminate skin smoothly covers said first redundant vacuum seal and said second redundant vacuum seal adjacent to said first redundant vacuum seal; and said composite laminate skin smoothly covers said first membrane and said first laminate release surface, said second membrane and said second laminate release surface.

14. The method of claim 13, further comprising steps of:

applying a first vacuum to said first vacuum zone, wherein said first vacuum is applied to a first interior space between the lay-up surface and said first membrane, said first breather being within said first interior space;

applying a second vacuum to said second vacuum zone, wherein said second vacuum is applied to a second interior space between the lay-up surface and said second membrane, said second breather being within said second interior space;

cutting said composite laminate skin between said first vacuum zone and said second vacuum zone, wherein said cutting step produces a first portion of said composite laminate skin over said first vacuum zone and a second portion of said composite laminate skin over said second vacuum zone;

holding said first membrane and said first portion to the lay-up surface at said first vacuum zone using said first vacuum; and holding said second membrane and said second portion to the lay-up surface at said second vacuum zone using said second vacuum.

15. The method of claim 13, further comprising steps of:

providing a rebate in the lay-up surface between said first vacuum seal and said second vacuum seal; and cutting said composite laminate skin over said rebate.

16. The method of claim 13, further comprising steps of:

cutting said composite laminate skin between said first vacuum zone and said second vacuum zone;

releasing said first vacuum; and allowing a first portion of said composite laminate skin to drop into a cure tool.

17. The method of claim 13, further comprising steps of:

cutting said composite laminate skin between said first vacuum zone and said second vacuum zone, wherein said cutting step produces a first portion of said composite laminate skin over said first vacuum zone and a second portion of said composite laminate skin over said second vacuum zone;

orienting said mandrel tool so that said second vacuum zone and said second portion are disposed above a cure tool;

releasing said second vacuum; and allowing said second portion of said composite laminate skin to drop into said cure tool.

18. A method of transferring an uncured composite laminate skin from a lay-up surface of a mandrel tool to a cure tool, comprising:
- a step for forming a first low profile seal of a first membrane to a surface of a mandrel tool at a first vacuum zone;
- a step for forming a second low profile seal of a second membrane to a surface of a mandrel tool at a second vacuum zone;
- a step for smoothly laying up a composite laminate skin over said first vacuum zone and said second vacuum zone;
- a step for separating said composite laminate skin into a first portion over said first vacuum zone and a second portion over said second vacuum zone; and
- a step for releasing said first portion individually of said second portion into a first cure tool.

19. The method of claim 18, wherein said step for forming a first low profile seal includes a step for adhering said first membrane to said surface.

20. The method of claim 18, wherein said step for forming a first low profile seal includes a step for providing a laminate release surface over said low profile seal.

21. The method of claim 18, wherein said step for releasing includes a step for orienting said mandrel tool to dispose said second portion above a second cure tool and releasing said second portion into said second cure tool.

22. A system for manufacturing large aircraft parts, comprising:
- a multiple head automated tape laying machine;
- a male mandrel lay-up tool having a lay-up surface with a plurality of vacuum zones defined on said lay-up surface including:
  - a first vacuum zone of said plurality of vacuum zones, said first vacuum zone having a first low profile vacuum seal at a first boundary of said first vacuum zone;
  - a second vacuum zone of said plurality of vacuum zones; said second vacuum zone having a second low profile vacuum seal at a second boundary of said second vacuum zone; and
  - a rebate that separates said first vacuum zone from said second vacuum zone; and
- a plurality of female cure tools.

23. The system of claim 22 further comprising:
- a first vacuum zone of said plurality of vacuum zones, said first vacuum zone having a first low profile vacuum seal at a first boundary of said first vacuum zone;
- a first membrane covering said first vacuum zone wherein said first low profile vacuum seal forms a first vacuum seal between said first membrane and said lay-up surface;
- a second vacuum zone of said plurality of vacuum zones; said second vacuum zone having a second low profile vacuum seal at a second boundary of said second vacuum zone;
- a second membrane covering second vacuum zone wherein said second low profile vacuum seal forms a second vacuum seal between said second membrane and said lay-up surface; and
- a rebate that lies between said first low profile vacuum seal and said second low profile vacuum seal, wherein said multiple head automated tape laying machine places a composite laminate material smoothly over said first low profile vacuum seal, said rebate, and said second low profile vacuum seal without bridging.

* * * * *